(12) United States Patent
Nix et al.

(10) Patent No.: US 12,013,701 B2
(45) Date of Patent: Jun. 18, 2024

(54) SYSTEMS AND METHODS FOR COMMUNICATING INTENT OF AN AUTONOMOUS VEHICLE

(71) Applicant: Uber Technologies, Inc., San Francisco, CA (US)

(72) Inventors: Molly Castle Nix, San Francisco, CA (US); Sean Chin, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 134 days.

(21) Appl. No.: 17/333,934

(22) Filed: May 28, 2021

(65) Prior Publication Data

US 2021/0356966 A1 Nov. 18, 2021

Related U.S. Application Data

(63) Continuation of application No. 16/585,497, filed on Sep. 27, 2019, now Pat. No. 11,022,973, which is a
(Continued)

(51) Int. Cl.
*G05D 1/00* (2006.01)
*B60W 50/00* (2006.01)
(Continued)

(52) U.S. Cl.
CPC ....... *G05D 1/0212* (2013.01); *B60W 50/0097* (2013.01); *B60W 50/08* (2013.01);
(Continued)

(58) Field of Classification Search
USPC .......................................................... 701/25
See application file for complete search history.

(56) References Cited

U.S. PATENT DOCUMENTS 6,836,719 B2 12/2004 Andersson et al.
7,649,444 B1 1/2010 Fear et al.
(Continued)

FOREIGN PATENT DOCUMENTS

EP 3050771 8/2016
EP 3676149 7/2020
(Continued)

OTHER PUBLICATIONS

PCT International Search Report and Written Opinion for PCT/US2018/000215, dated Dec. 10, 2018, 20 pages.
(Continued)

*Primary Examiner* — Jonathan M Dager
(74) *Attorney, Agent, or Firm* — Schwegman Lundberg & Woessner

(57) ABSTRACT

The present disclosure provides systems and methods to communicate intent of an autonomous vehicle. In particular, the systems and methods of the present disclosure can receive, from an autonomy computing system of an autonomous vehicle, data indicating an intent of the autonomous vehicle to perform a driving maneuver. It can be determined that the intent of the autonomous vehicle should be communicated to a passenger of the autonomous vehicle. Responsive to determining that the intent of the autonomous vehicle should be communicated to the passenger of the autonomous vehicle, a graphical interface indicating the intent of the autonomous vehicle can be generated and provided for display for viewing by the passenger.

18 Claims, 10 Drawing Sheets

Related U.S. Application Data continuation of application No. 15/700,211, filed on Sep. 11, 2017, now Pat. No. 10,429,846.

(60) Provisional application No. 62/550,796, filed on Aug. 28, 2017.

(51) Int. Cl.
| | |
|---|---|
| *B60W 50/08* | (2020.01) |
| *B60W 50/14* | (2020.01) |
| *G01C 21/36* | (2006.01) |
| *B60K 35/10* | (2024.01) |
| *B60K 35/28* | (2024.01) |
| *B60K 35/29* | (2024.01) |

(52) U.S. Cl.
CPC ......... *B60W 50/14* (2013.01); *G01C 21/3676* (2013.01); *G05D 1/0088* (2013.01); *B60K 35/10* (2024.01); *B60K 35/28* (2024.01); *B60K 35/29* (2024.01); *B60K 2360/119* (2024.01); *B60K 2360/16* (2024.01); *B60K 2360/166* (2024.01); *B60K 2360/175* (2024.01); *B60K 2360/186* (2024.01); *B60K 2360/191* (2024.01); *B60W 2050/146* (2013.01); *B60W 2554/80* (2020.02); *B60W 2555/60* (2020.02)

(56) References Cited

U.S. PATENT DOCUMENTS

| | | | |
|---|---|---|---|
| 7,844,394 B2 * | 11/2010 | Kim .................. G01C 21/36 701/457 |
| 8,676,431 B1 * | 3/2014 | Mariet ................ G08G 1/0962 701/28 |
| 9,047,703 B2 * | 6/2015 | Beckwith .............. G06T 19/006 |
| 9,459,623 B1 * | 10/2016 | Raghu ................ G05D 1/0088 |
| 9,505,305 B2 | 11/2016 | Tsuyunashi et al. |
| 9,514,650 B2 * | 12/2016 | Ng-Thow-Hing ..... G08G 1/167 |
| 9,849,784 B1 * | 12/2017 | Chan .................. G08G 1/015 |
| 9,911,330 B2 * | 3/2018 | Takagi ............... G08G 1/09623 |
| 9,952,054 B2 | 4/2018 | An et al. |
| 10,053,001 B1 * | 8/2018 | Nabbe ................ B60Q 1/543 |
| 10,249,110 B2 * | 4/2019 | Poeppel ............. G07C 5/008 |
| 10,429,846 B2 | 10/2019 | Nix et al. |
| 10,488,215 B1 * | 11/2019 | Yu .................... G01C 21/365 |
| 10,493,622 B2 * | 12/2019 | Sweeney ........... G01C 21/3676 |
| 10,627,813 B2 * | 4/2020 | Tsuji .................. B60K 35/00 |
| 10,679,502 B2 * | 6/2020 | Baba ................. B60W 30/09 |
| 10,752,223 B2 * | 8/2020 | You .................. B60W 30/095 |
| 11,022,973 B2 | 6/2021 | Nix et al. |
| 11,422,003 B2 * | 8/2022 | Hashimoto ........ G01C 21/3848 |
| 11,472,440 B2 * | 10/2022 | Yurdana ............ B60W 60/0016 |
| 2001/0013837 A1 | 8/2001 | Yamashita et al. |
| 2003/0078728 A1 | 4/2003 | Engelsberg et al. |
| 2005/0027444 A1 | 2/2005 | Kim |
| 2009/0069977 A1 | 3/2009 | Markyvech |
| 2009/0326796 A1 * | 12/2009 | Prokhorov ............. G08G 1/167 701/532 |
| 2010/0106413 A1 * | 4/2010 | Mudalige .............. B60W 50/14 701/469 |
| 2011/0090093 A1 | 4/2011 | Grimm et al. |
| 2012/0095646 A1 * | 4/2012 | Ghazarian ............ G01S 19/17 340/905 |
| 2012/0140984 A1 * | 6/2012 | Miyajima .............. G06V 10/96 382/103 |
| 2012/0173069 A1 * | 7/2012 | Tsimhoni ........ B60W 30/18163 701/25 |
| 2012/0206483 A1 * | 8/2012 | Funabashi ........ G08G 1/096783 345/629 |
| 2013/0179023 A1 | 7/2013 | Schmidt |
| 2014/0067259 A1 * | 3/2014 | Walsh ................ G06Q 50/26 701/437 |
| 2014/0222277 A1 | 8/2014 | Tsimhoni et al. |
| 2014/0365126 A1 | 12/2014 | Vulcano et al. |
| 2015/0035981 A1 * | 2/2015 | Otsuki .................. B60R 1/00 348/148 |
| 2015/0046038 A1 * | 2/2015 | Kawamata ......... G08G 1/09623 701/41 |
| 2015/0057914 A1 * | 2/2015 | Hiramatsu ............. G08G 1/164 701/117 |
| 2015/0066284 A1 | 3/2015 | Yopp |
| 2015/0134180 A1 * | 5/2015 | An .................... B60Q 1/507 701/23 |
| 2015/0151725 A1 | 6/2015 | Clarke et al. |
| 2015/0178998 A1 | 6/2015 | Attard et al. |
| 2015/0314783 A1 * | 11/2015 | Nespolo ............ B60W 30/0953 701/301 |
| 2015/0346718 A1 | 12/2015 | Stenneth |
| 2016/0027305 A1 * | 1/2016 | Inaba .................. G08G 1/0112 340/905 |
| 2016/0046297 A1 * | 2/2016 | Kawakami ............ G01C 21/26 701/29.1 |
| 2016/0078757 A1 * | 3/2016 | Inaba .................. G09B 29/007 701/119 |
| 2016/0107655 A1 | 4/2016 | Desnoyer et al. |
| 2016/0176358 A1 | 6/2016 | Raghu et al. |
| 2016/0232790 A1 | 8/2016 | Massey et al. |
| 2016/0335892 A1 * | 11/2016 | Okada .................. G08G 1/164 |
| 2016/0375900 A1 | 12/2016 | Laur et al. |
| 2017/0072947 A1 | 3/2017 | Lavoie |
| 2017/0137025 A1 * | 5/2017 | Muto .................. G08G 1/0133 |
| 2017/0185088 A1 | 6/2017 | Sakai et al. |
| 2017/0254880 A1 | 9/2017 | Smith |
| 2017/0282930 A1 * | 10/2017 | Kochhar ............ B60W 50/0097 |
| 2017/0297401 A1 | 10/2017 | Hrovat et al. |
| 2017/0323639 A1 | 11/2017 | Tzirkel-Hancock et al. |
| 2017/0329329 A1 | 11/2017 | Kamhi et al. |
| 2017/0334459 A1 | 11/2017 | McNew |
| 2017/0369073 A1 | 12/2017 | Huber |
| 2018/0015878 A1 | 1/2018 | McNew |
| 2018/0039273 A1 | 2/2018 | Delp et al. |
| 2018/0046193 A1 * | 2/2018 | Takada .................. G05D 1/0276 |
| 2018/0047285 A1 | 2/2018 | Johnson |
| 2018/0074497 A1 * | 3/2018 | Tsuji ................ B60W 30/18163 |
| 2018/0075747 A1 | 3/2018 | Pahwa |
| 2018/0088574 A1 | 3/2018 | Latotzki et al. |
| 2018/0089901 A1 * | 3/2018 | Rober .................. B60Q 9/00 |
| 2018/0101738 A1 | 4/2018 | Mualla |
| 2018/0173237 A1 * | 6/2018 | Reiley ................ B60Q 1/545 |
| 2018/0194280 A1 * | 7/2018 | Shibata .............. G01C 21/3484 |
| 2018/0244174 A1 | 8/2018 | Tan |
| 2018/0322783 A1 * | 11/2018 | Toyoda ................ G06T 13/80 |
| 2018/0365740 A1 | 12/2018 | Nix et al. |
| 2019/0064824 A1 * | 2/2019 | Nix ..................... B60W 50/14 |
| 2019/0066506 A1 * | 2/2019 | Kazemi ............. B60W 30/0956 |
| 2019/0094040 A1 * | 3/2019 | Lewis ................ G06T 17/05 |
| 2019/0241198 A1 * | 8/2019 | Mori .................. G08G 1/16 |
| 2019/0256083 A1 * | 8/2019 | Kang ................. B60W 10/04 |
| 2019/0339382 A1 * | 11/2019 | Hess .................. G01S 13/42 |
| 2020/0026298 A1 | 1/2020 | Nix et al. |
| 2021/0141385 A1 * | 5/2021 | Michaelis ............. B60K 35/10 |
| 2023/0061784 A1 * | 3/2023 | Agrawal .............. G06V 20/56 |
| 2023/0140557 A1 * | 5/2023 | Kamakura ............ B60K 35/00 340/435 |
| 2023/0326218 A1 * | 10/2023 | Divekar ................ B60R 1/00 348/118 |

FOREIGN PATENT DOCUMENTS

| | | |
|---|---|---|
| EP | 3676149 | 10/2021 |
| EP | 3932769 | 1/2022 |
| WO | WO2016/109829 | 7/2016 |
| WO | 2019046024 | 3/2019 |

OTHER PUBLICATIONS

PCT International Search Report and Written Opinion for PCT/US2018/047044, dated Nov. 19, 2018, 14 pages.

"European Application Serial No. 21193381.7, Extended European Search Report dated Nov. 24, 2021", 12 pgs.

(56) References Cited

OTHER PUBLICATIONS

"U.S. Appl. No. 15/700,211, Non Final Office Action dated Nov. 14, 2018", 9 pgs.
"U.S. Appl. No. 15/700,211, Examiner Interview Summary dated Feb. 12, 2019", 3 pgs.
"U.S. Appl. No. 15/700,211, Response filed Feb. 14, 2019 to Non Final Office Action dated Nov. 14, 2018", 12 pgs.
"U.S. Appl. No. 15/700,211, Final Office Action dated Mar. 6, 2019", 13 pgs.
"U.S. Appl. No. 15/700,211, Examiner Interview Summary dated Apr. 15, 2019", 3 pgs.
"U.S. Appl. No. 15/700,211, Response filed May 6, 2019 to Final Office Action dated Mar. 6, 2019", 9 pgs.
"U.S. Appl. No. 15/700,211, Notice of Allowance dated May 22, 2019", 7 pgs.
"International Application Serial No. PCT US2018 047044, International Preliminary Report on Patentability dated Mar. 12, 2020", 10 pgs.
"U.S. Appl. No. 16/585,497, Preliminary Amendment filed Sep. 27, 2019", 7 pgs.
"U.S. Appl. No. 16/585,497, Non Final Office Action dated Sep. 23, 2020", 7 pgs.
"U.S. Appl. No. 16/585,497, Response filed Jan. 25, 2021 to Non Final Office Action dated Sep. 23, 2020", 7 pgs.
"U.S. Appl. No. 16/585,497, Notice of Allowance dated Feb. 4, 2021", 11 pgs.
"European Application Serial No. 18773296.1, Response to Communication pursuant to Rules 161(1) and 162 EPC filed Oct. 19, 2020", 18 pgs.
"European Application Serial No. 18773296.1, Intention to Grant dated Apr. 16, 2021", 32 pgs.
"European Application Serial No. 21193381.7, Response filed Jun. 30, 2022 to Extended European Search Report dated Nov. 24, 2021", 14 pgs.

* cited by examiner

SYSTEMS AND METHODS FOR COMMUNICATING INTENT OF AN AUTONOMOUS VEHICLE

PRIORITY CLAIM

This application claims priority to U.S. Patent Application Ser. No. 62/550,796, filed Aug. 28, 2017, and entitled "SYSTEMS AND METHODS FOR COMMUNICATING INTENT OF AN AUTONOMOUS VEHICLE," and U.S. Pat. No. 11,022,973, filed on Sep. 27, 2019, and entitled "SYSTEMS AND METHODS FOR COMMUNICATING INTENT OF AN AUTONOMOUS VEHICLE," the disclosures of which are incorporated by reference herein in their entirety.

FIELD

The present disclosure relates generally to autonomous vehicles. More particularly, the present disclosure relates to communicating intent of an autonomous vehicle.

BACKGROUND

An autonomous vehicle is a vehicle that is capable of sensing its environment and navigating with minimal or no human input. In particular, an autonomous vehicle can observe its surrounding environment using a variety of sensors and identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to communicate intent of an autonomous vehicle. The method includes receiving, from an autonomy computing system of an autonomous vehicle, data indicating an intent of the autonomous vehicle to perform a driving maneuver. The method includes determining, based at least in part on the data indicating the intent, that the intent of the autonomous vehicle should be communicated to a passenger of the autonomous vehicle. The method includes, responsive to determining that the intent of the autonomous vehicle should be communicated to the passenger: generating a graphical interface indicating the intent of the autonomous vehicle; and providing for display the graphical interface for viewing by the passenger.

Another example aspect of the present disclosure is directed to a computing system that includes one or more processors and one or more non-transitory computer-readable media that collectively store instructions that, when executed by the one or more processors, cause the computing system to perform operations. The operations include receiving, from an autonomy computing system of an autonomous vehicle, data indicating an intent of the autonomous vehicle. The operations include determining, based at least in part on the data indicating the intent, a plurality of intents of the autonomous vehicle. The operations include selecting, from amongst the plurality of intents and based at least in part on a predetermined hierarchy, the intent of the autonomous vehicle. The operations include determining that the intent of the autonomous vehicle should be communicated to a passenger of the autonomous vehicle. The operations include, responsive to determining that the intent of the autonomous vehicle should be communicated to the passenger: generating a graphical interface indicating the intent of the autonomous vehicle; and providing for display the graphical interface for viewing by the passenger.

Another example aspect of the present disclosure is directed to one or more non-transitory computer-readable media that collectively store instructions that, when executed by one or more processors, cause a computing system to perform operations. The operations include receiving, from an autonomy computing system of an autonomous vehicle, data indicating an intent of the autonomous vehicle. The operations include, responsive to determining that the data indicating the intent meets a predetermined threshold, determining that the intent of the autonomous vehicle should be communicated to a passenger of the autonomous vehicle. The operations include, responsive to determining that the intent of the autonomous vehicle should be communicated to the passenger: generating a graphical interface indicating the intent of the autonomous vehicle; and providing for display the graphical interface for viewing by the passenger.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
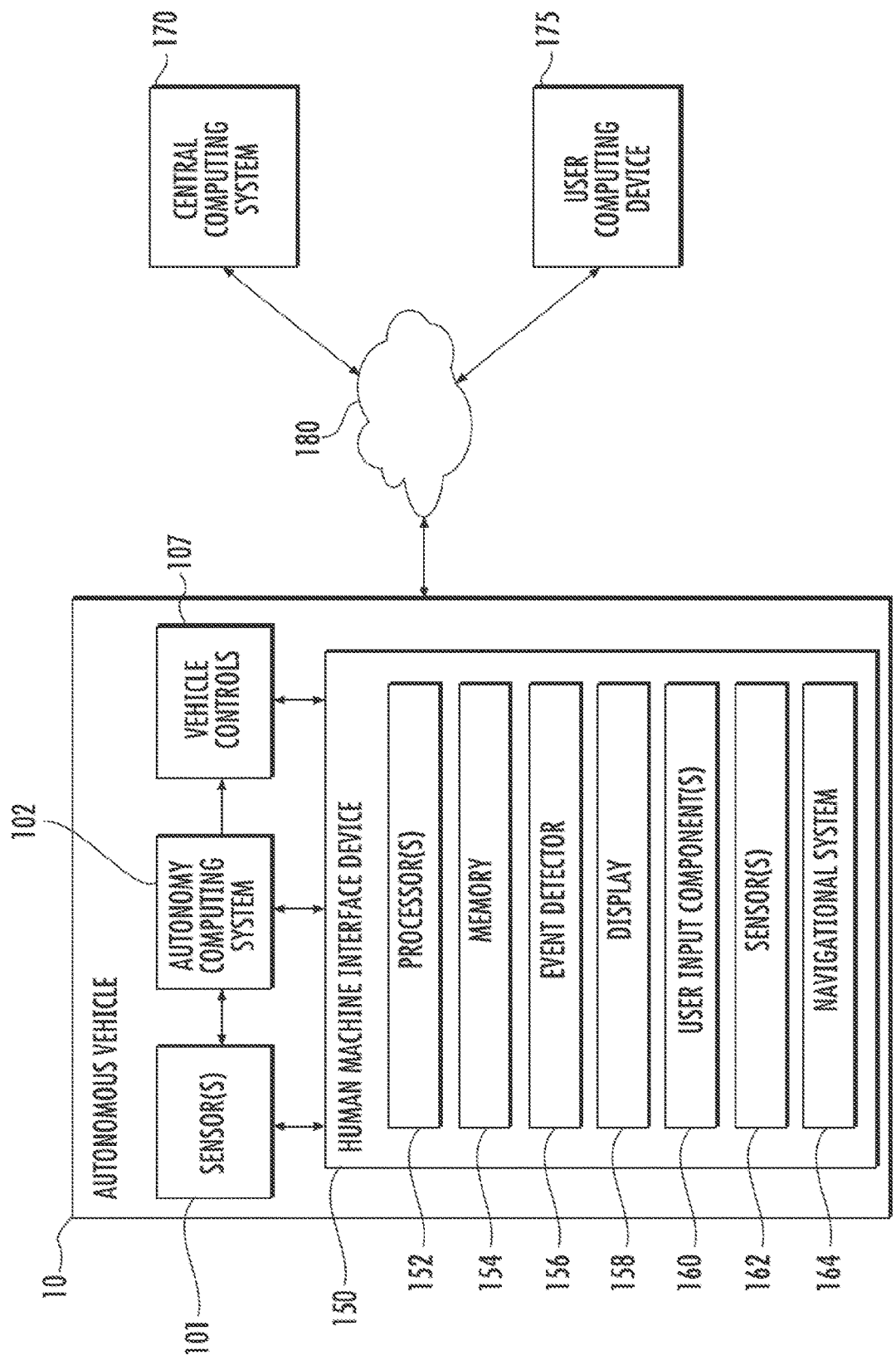
FIG. 1 depicts a block diagram of an example computing system according to example embodiments of the present disclosure.

Generally, the present disclosure is directed to methods and systems for communicating intent of an autonomous vehicle. For example, an autonomy computing system of an autonomous vehicle can determine a motion plan for the autonomous vehicle based on maps and data received from sensors of the autonomous vehicle that describes the environment in which the autonomous vehicle is operating. Such a motion plan can include data that indicates intents of the autonomous vehicle. For example, the autonomous vehicle can plan to stop at an approaching intersection (e.g., based on a stop sign or signal determined from map and/or environmental sensor data). A computing system can receive, from the autonomy computing system of the autonomous vehicle, data indicating the intent of the autonomous vehicle (e.g., that the autonomous vehicle intends to stop at the approaching intersection). Multiple intents of the autonomous vehicle can be determined based on the data indicating the intent. For example, the data can indicate that the autonomous vehicle plans to stop at the approaching intersection because there is a red signal light and because pedestrians are currently crossing the path of the autonomous vehicle (e.g., at the intersection). From amongst the determined intents, an intent of the autonomous vehicle can be selected. In some implementations, the intent can be selected based on a predetermined hierarchy. For example, an intent indicating that the autonomous vehicle plans to stop at the approaching intersection because there is a red signal light can be selected instead of an intent indicating that the autonomous vehicle plans to stop because pedestrians are currently crossing the path of the autonomous vehicle because a predetermined hierarchy can indicate that intents associated with traffic signals should be selected in lieu of intents associated with pedestrian crossings. A determination can be made that the intent of the autonomous vehicle (e.g., planned deceleration associated with the approaching intersection) should be communicated to a passenger of the autonomous vehicle (e.g., operator or non-operator passenger of the autonomous vehicle). For example, a determination can be made that the deceleration associated with the approaching intersection is of sufficient magnitude (e.g., exceeds a predetermined threshold) that a passenger of the autonomous vehicle should be notified.

Responsive to a determination that a passenger of the autonomous vehicle should be notified of the intent of the autonomous vehicle, a graphical interface indicating the intent of the autonomous vehicle can be generated and displayed for viewing by the passenger of the autonomous vehicle. For example, a graphical interface indicating that the autonomous vehicle is (or is planning to) decelerate due to the approaching intersection can be generated and displayed to a passenger of the autonomous vehicle.

In some implementations, the graphical interface can include a map of the area surrounding the current location of the autonomous vehicle and can depict the location of the autonomous vehicle (e.g., within the surrounding area). In such implementations, the graphical interface can include a graphic overlay on the map indicating the intent of the autonomous vehicle. In some implementations, generating the graphical interface can include distilling or summarizing complex vehicle intent information into an easily understandable graphical element that quickly conveys to the passenger the intent of the autonomous vehicle. The graphical interface can include (e.g., as part of the graphic overlay) one or more elements depicting an event associated with the intent of the autonomous vehicle. For example, the autonomous vehicle can be stopped for two cars, and the graphic overlay can indicate that the autonomous vehicle is stopped (e.g., via a graphic corresponding to a stop sign) and the graphical interface can indicate that the associated event is waiting for two cars (e.g., via one or more textual elements). Similarly, the autonomous vehicle can be approaching a traffic signal and the graphical overlay can indicate the intent of the autonomous vehicle (e.g., continuing, stopping, stopped, or the like) and the associated event, for example, the status of the traffic signal (e.g., red, yellow, green, or the like). In some implementations, the graphical interface can indicate one or more parameters associated with the event. For example, the autonomous vehicle can be approaching a turn and the graphical interface can indicate a time until completion or execution of the turn. Similarly, the autonomous vehicle can be yielding (e.g., decelerating) in response to another vehicle, a pedestrian, a cyclist, or the like, and the graphical interface can indicate a speed of the vehicle, cyclist, pedestrian, or the like and/or a distance between the autonomous vehicle and the vehicle, cyclist, pedestrian, or the like.

In some implementations, the computing system can determine that the intent of the autonomous vehicle should be communicated to the passenger based on a determination that a frequency in the change of the intent indicated by the data received from the autonomy computing system meets a predetermined threshold. The data received from the autonomy computing system can indicate multiple intents within a short period of time (e.g., the autonomy computing system can frequently alter its planned motion path for the autonomous vehicle based on, for example, changes in data received from sensors of the autonomous vehicle). For example, the data received from the autonomy computing system can indicate that the autonomous vehicle intends to decelerate in order to avoid a pedestrian, however, the data received from the autonomy computing system could subsequently indicate that the autonomous vehicle intends to maintain its current speed (e.g., because data received from sensors of the autonomous vehicle indicates the pedestrian has already cleared the path of the autonomous vehicle). Accordingly, in order to prevent multiple intents (e.g., possibly contradictory intents) from being communicated to the passenger of the autonomous vehicle within a short time period, a determination can be made with regards to the frequency in the change of the intent indicated by the data received from the autonomy computing system, and the intent of the autonomous vehicle can be communicated in response to a determination that the frequency in the change of the intent meets a predetermined threshold (e.g., the intent of the autonomous vehicle has remained constant for a threshold period of time). For example, the intent of the autonomous vehicle can be communicated in response to a determination that the frequency in the change of the intent is less than a predetermined threshold.

Additionally or alternatively, the computing system can determine that the intent of the autonomous vehicle should be communicated to the passenger based on a determination that a degree of confidence of an event associated with the intent indicated by the data received from the autonomy computing system meets a predetermined threshold. The data received from the autonomy computing system can indicate an event associated with the intent of the autonomous vehicle. For example, the data can indicate that the autonomous vehicle intends to decelerate because a pedestrian has entered the path of the autonomous vehicle. In certain scenarios, the autonomous vehicle can determine its intent, but the nature of the associated event can be unclear. For example, the autonomous vehicle can detect an object in its path and determine to decelerate in order to avoid the object, but the autonomous vehicle can be uncertain regarding the nature of the object (e.g., whether the object is a pedestrian, cyclist, or the like). This uncertainty can be indicated by the data received from the autonomy computing system. For example, the data can indicate the nature of the object to a degree of confidence. Because communicating erroneous information about the nature of the event to the passenger could undermine the confidence of the passenger in the autonomous vehicle, a determination can be made about whether to communicate the intent of the autonomous vehicle based on a determination that the degree of confidence meets a predetermined threshold (e.g., the intent can be conveyed when the confidence regarding the event exceeds the predetermined threshold).

The computing system can include a human machine interface device (e.g., a mobile device, tablet computing device, or the like) that can be viewable by a passenger of the autonomous vehicle. The device can include a display (e.g., for viewing by the passenger), one or more processors, and memory. The memory can include instructions that when executed by the processor(s) cause the device to perform one or more of the operations described herein.

The systems and methods described herein can provide a number of technical effects and benefits. For example, the systems and methods described herein can communicate the intent of an autonomous vehicle to its passenger thereby allowing the passenger to anticipate impending changes in force and increasing passenger comfort. Additionally or alternatively, by communicating the intent of an autonomous vehicle to its passenger, the systems and methods described herein can demonstrate environmental understanding and driving competence of the autonomous vehicle to its passenger thereby reassuring the passenger that the autonomous vehicle is correctly interpreting its environment and acting appropriately.

With reference now to the Figures, example embodiments of the present disclosure will be discussed in further detail.

FIG. 1 depicts a block diagram of an example computing system according to example embodiments of the present disclosure. Referring to FIG. 1, the example computing system includes autonomous vehicle 10, central computing system 170, and user computing device 175 that are communicatively coupled over one or more communication networks 180. Autonomous vehicle 10 can include one or more sensors 101, autonomy computing system 102, one or more vehicle controls 107, and human machine interface device 150.

Human machine interface device 150 can enable communication, control, and/or other interface actions to occur between autonomous vehicle 10 and a human (e.g., a passenger located within autonomous vehicle 10). Human machine interface device 150 can be communicatively coupled to autonomy computing system 102 to enable exchange of data, instructions, and/or requests between system 102 and device 150.

Human machine interface device 150 can include or be implemented by one or more computing devices that are operatively connected. Human machine interface device 150 can be an embedded computing device or a stand-alone computing device. In one particular example, human machine interface device 150 can be a tablet computing device that is positioned within autonomous vehicle 10 for viewing by a passenger (e.g., within a rear seat area of autonomous vehicle 10).

Human machine interface device 150 can include one or more processors 152, memory 154, event detector 156, display 158, one or more user input components 160, one or more sensors 162, and navigational system 164. Processor(s) 152 can be any suitable processing device (e.g., a processor core, a microprocessor, an application-specific integrated circuit (ASIC), a field-programmable gate array (FPGA), a controller, a microcontroller, etc.) and can be one processor or a plurality of processors that are operatively connected. Memory 154 can include one or more non-transitory computer-readable storage media, such as random-access memory (RAM), read-only memory (ROM), electrically erasable programmable read-only memory (EEPROM), erasable programmable read-only memory (EPROM), one or more memory devices, flash memory devices, etc., and combinations thereof.

Memory 154 can store information that can be accessed by processor(s) 152. For instance, memory 154 (e.g., one or more non-transitory computer-readable storage mediums, memory devices) can store data that can be obtained, received, accessed, written, manipulated, created, and/or stored. Memory 154 can also store computer-readable instructions that can be executed by processor(s) 152. The instructions can be software written in any suitable programming language or can be implemented in hardware. Additionally, or alternatively, the instructions can be executed in logically and/or virtually separate threads on processor(s) 152. For example, memory 154 can store instructions that when executed by processor(s) 152 cause processor(s) 152 to perform any of the operations and/or functions described herein.

In some implementations, human machine interface device 150 can include display device 158 (e.g., a touch-sensitive display device) and/or other input/output components 160 that provide an interactive user interface. For example, display device 158 can be a rear-seat display device that is accessible by a passenger that is located in a rear seat of autonomous vehicle 10.

In some implementations, in addition or alternatively to human machine interface device 150, the systems and methods of the present disclosure can include or leverage user computing device 175 that is associated with the passenger. For example, in some implementations, in addition or alternatively to the display of the user interface by human machine interface device 150, the interactive user interface can be provided on or accessible via a display of user computing device 175. User computing device 175 can be communicatively connected to human machine interface device 150 via a local area network such as a short range wireless connection (e.g., a Bluetooth, ZigBee, near-field communication (NFC), infrared, etc.) or other forms of connections (e.g., hardwiring). As examples, user computing device 175 can be a smartphone, tablet computing device, wearable computing device, portable gaming device, handheld display screen, or other form of computing device.

In yet further implementations, certain operations described herein can be performed by central computing system 170 that is remotely located to autonomous vehicle 10 and in communication with autonomous vehicle 10 over network(s) 180 (e.g., cellular data networks, satellite communication networks, wide area networks, etc.). As an example, central computing system 170 can include one or more server computing devices. In the event that plural server computing devices are used, the server computing devices can be arranged according to a parallel computing architecture, a sequential computing architecture, or combinations thereof. In some implementations, central computing system 170 can provide control, monitoring, management, and/or other functionality for a fleet of autonomous vehicles including autonomous vehicle 10.

Network(s) 180 can be any type of network or combination of networks that allows for communication between devices. In some embodiments, network(s) 180 can include one or more of a local area network, wide area network, the Internet, secure network, cellular network, mesh network, peer-to-peer communication link, and/or some combination thereof, and can include any number of wired or wireless links. Communication over network(s) 180 can be accomplished, for instance, via a network interface using any type of protocol, protection scheme, encoding, format, packaging, etc.

In accordance with aspects of the disclosure, a computing system of autonomous vehicle 10 can be configured to communicate intent of autonomous vehicle 10 to a passenger of autonomous vehicle 10 (e.g., an operator and/or non-operator passenger). For example, human machine interface device 150 can receive, from autonomy computing system 102, data indicating an intent of autonomous vehicle 10 (e.g., intent to perform a driving maneuver) and can determine, based on the data indicating the intent, that the intent of autonomous vehicle 10 should be communicated to a passenger of autonomous vehicle 10. Responsive to determining that the intent of autonomous vehicle 10 should be communicated to the passenger, human machine interface device 150 can generate a graphical interface indicating the intent of autonomous vehicle 10 and can provide the graphical interface for display (e.g., via display 158) for viewing by the passenger. In some implementations, human machine interface device 150 can generate or otherwise trigger an audible signal for the passenger (e.g., a signal indicating the intent, a signal alerting the passenger to view display 158 for information regarding the intent, or the like).

In some implementations, human machine interface device 150 can determine multiple intents of autonomous vehicle 10 based on the data received from autonomy computing system 102. For example, the data received from autonomy computing system 102 can indicate autonomous vehicle 10 plans to stop at an approaching intersection because there is a red signal light and because pedestrians are currently crossing the path of autonomous vehicle 10 (e.g., at the intersection). In such implementations, human machine interface device 150 can select, from amongst the intents, an intent to communicate to the passenger of autonomous vehicle 10. In some implementations, human machine interface device 150 can be configured to select the intent to be communicated to the passenger based on a predetermined hierarchy. For example, human machine interface device 150 can be configured to select an intent indicating that autonomous vehicle 10 plans to stop at the approaching intersection because there is a red signal light instead of an intent indicating that autonomous vehicle 10 plans to stop because pedestrians are currently crossing the path of autonomous vehicle 10 because a predetermined hierarchy can indicate that intents associated with traffic signals should be selected in lieu of intents associated with pedestrian crossings.

In some implementations, human machine interface device 150 can be configured to determine that the intent of autonomous vehicle 10 should be communicated to the passenger based on a determination that a frequency in the change of the intent indicated by the data received from autonomy computing system 102 meets a predetermined threshold. The data received from autonomy computing system 102 can indicate multiple intents within a short period of time (e.g., autonomy computing system 102 can frequently alter its planned motion path for autonomous vehicle 10 based on, for example, changes in data received from sensor(s) 101). For example, the data received from autonomy computing system 102 can indicate that autonomous vehicle 10 intends to decelerate in order to avoid a pedestrian, however, the data received from autonomy computing system 102 could subsequently indicate that autonomous vehicle 10 intends to maintain its current speed (e.g., because data received from sensor(s) 101 indicates the pedestrian has already cleared the path of autonomous vehicle 10). Accordingly, in order to prevent multiple intents (e.g., possibly contradictory intents) from being communicated to the passenger of autonomous vehicle 10 within a short time period, human machine interface device 150 can be configured to make a determination with regards to the frequency in the change of the intent indicated by the data received from autonomy computing system 102, and the intent of autonomous vehicle 10 can be communicated in response to a determination that the frequency in the change of the intent meets a predetermined threshold (e.g., the intent of autonomous vehicle 10 has remained constant for a threshold period of time). For example, the intent of autonomous vehicle 10 can be communicated in response to a determination that the frequency in the change of the intent is less than a predetermined threshold.

Additionally or alternatively, human machine interface device 150 can be configured to determine that the intent of autonomous vehicle 10 should be communicated to the passenger based on a determination that a degree of confidence of an event associated with the intent indicated by the data received from autonomy computing system 102 meets a predetermined threshold. The data received from autonomy computing system 102 can indicate an event associated with the intent of autonomous vehicle 10. For example, the data can indicate that autonomous vehicle 10 intends to decelerate because a pedestrian has entered the path of autonomous vehicle 10. In certain scenarios, autonomous vehicle 10 can determine its intent, but the nature of the associated event can be unclear. For example, autonomous vehicle 10 can detect an object in its path and determine to decelerate in order to avoid the object, but autonomous vehicle 10 can be uncertain regarding the nature of the object (e.g., whether the object is a pedestrian, cyclist, or the like). This uncertainty can be indicated by the data received from autonomy computing system 102. For example, the data can indicate the nature of the object to a degree of confidence. Because communicating erroneous information about the nature of the event to the passenger could undermine the confidence of the passenger in autonomous vehicle 10, human machine interface device 150 can be configured to make a determination about whether to communicate the intent of autonomous vehicle 10 based on a determination that the degree of confidence meets a predetermined threshold (e.g., the intent can be conveyed when the confidence regarding the event exceeds the predetermined threshold).

The intent can be an intent to perform a driving maneuver. For example, the intent could be that autonomous vehicle 10 intends to change lanes, decelerate (e.g., to yield to and/or stop for a traffic sign or signal, approaching vehicle, pedestrian, cyclist, unclassified object or the like), merge into traffic, pull alongside a curb or roadside, perform a left- or right-hand turn (e.g., a protected or unprotected turn), deviate from a typical pathway within its lane and/or without substantially intruding an adjacent lane in order to avoid an object or obstruction, decelerate or alter its speed based on a context-based speed limit (e.g., a school zone), or other driving maneuver. In some implementations, human machine interface device 150 can be configured to distill or summarize complex vehicle intent information such that it is easily understandable by a passenger. For example, as indicated above, human machine interface device 150 can be configured to generate a graphical interface indicating the intent of autonomous vehicle 10. The graphical interface can include one or more elements that distill or summarize complex vehicle intent information such that it is easily understandable by a passenger. For example, FIG. 2 depicts example graphical interface elements for communicating intent of an autonomous vehicle according to example embodiments of the present disclosure.

Figure 2:
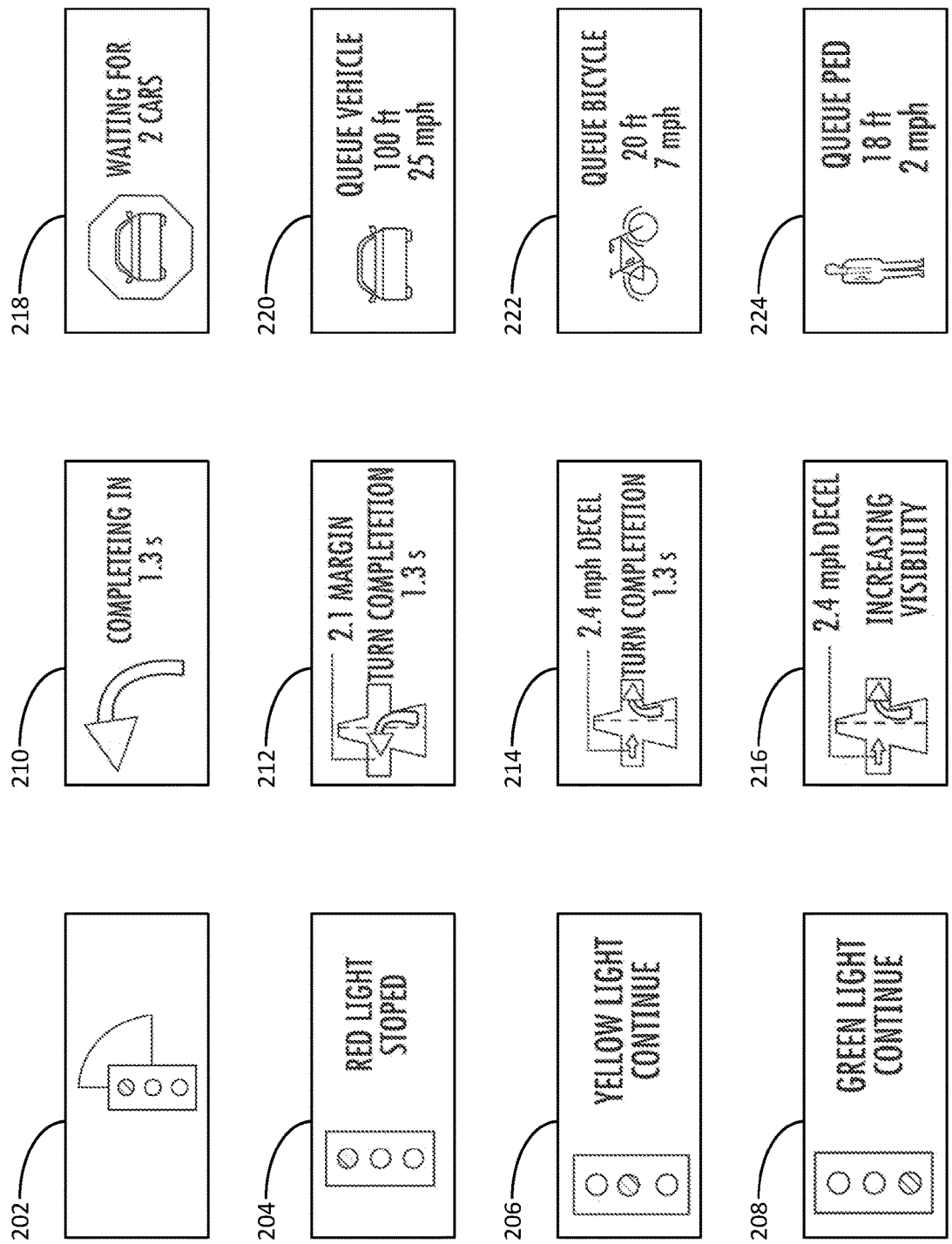
FIG. 2 depicts example graphical interface elements for communicating intent of an autonomous vehicle according to example embodiments of the present disclosure.

Referring to FIG. 2, graphics 202, 204, 206, 208, 210, 212, 214, 216, 218, 220, 222, and 224 include elements that distill or summarize complex vehicle intent information such that it is easily understandable by a passenger. In some implementations, the one or more elements of a graphic indicating intent can include elements depicting an event associated with the intent. For example, graphic 202 can depict an intent of autonomous vehicle 10 to decelerate in response to a red traffic signal. Similarly, graphic 204 can depict an intent of autonomous vehicle 10 to remain stopped for a red traffic signal; graphic 204 can depict an intent of autonomous vehicle 10 to maintain its current velocity in response to a yellow traffic signal; graphic 208 can depict an intent of autonomous vehicle 10 to maintain its current velocity in response to a green traffic signal; graphics 210 and 212 can depict an intent of autonomous vehicle 10 to perform a left-hand turn; graphics 214 and 216 can depict an intent of autonomous vehicle 10 to perform a right-hand turn; graphic 218 can depict an intent of autonomous vehicle 10 to remain stopped for two other vehicles; graphic 220 can depict an intent of autonomous vehicle 10 to remain stopped or decelerate for another vehicle; graphic 222 can depict an intent of autonomous vehicle 10 to remain stopped or decelerate for a cyclist; and graphic 224 can depict an intent of autonomous vehicle 10 to remain stopped or decelerate for a pedestrian. In some implementations, the one or more elements of a graphic indicating intent can include elements that provide contextual information associated with the intent and/or associated event. For example, graphics 210, 212, and/or 214 can indicate a time until the turn is completed; graphic 212 can indicate a margin between autonomous vehicle 10 and an approaching vehicle; graphics 214 and/or 216 can indicate a velocity and/or acceleration status of an approaching vehicle; and graphics 220, 222, and/or 224 can indicate a distance to and/or velocity of another vehicle, a cyclist, and/or a pedestrian, respectively.

In some implementations, human machine interface device 150 can be configured to generate a graphical interface that includes a map depicting the current location of autonomous vehicle 10. In such implementations, the graphical interface can include a graphic overlay on the map indicating an intent of autonomous vehicle 10. For example, FIGS. 3A-G depict example graphical interfaces for communicating intent of an autonomous vehicle according to example embodiments of the present disclosure.

Figure 3A:
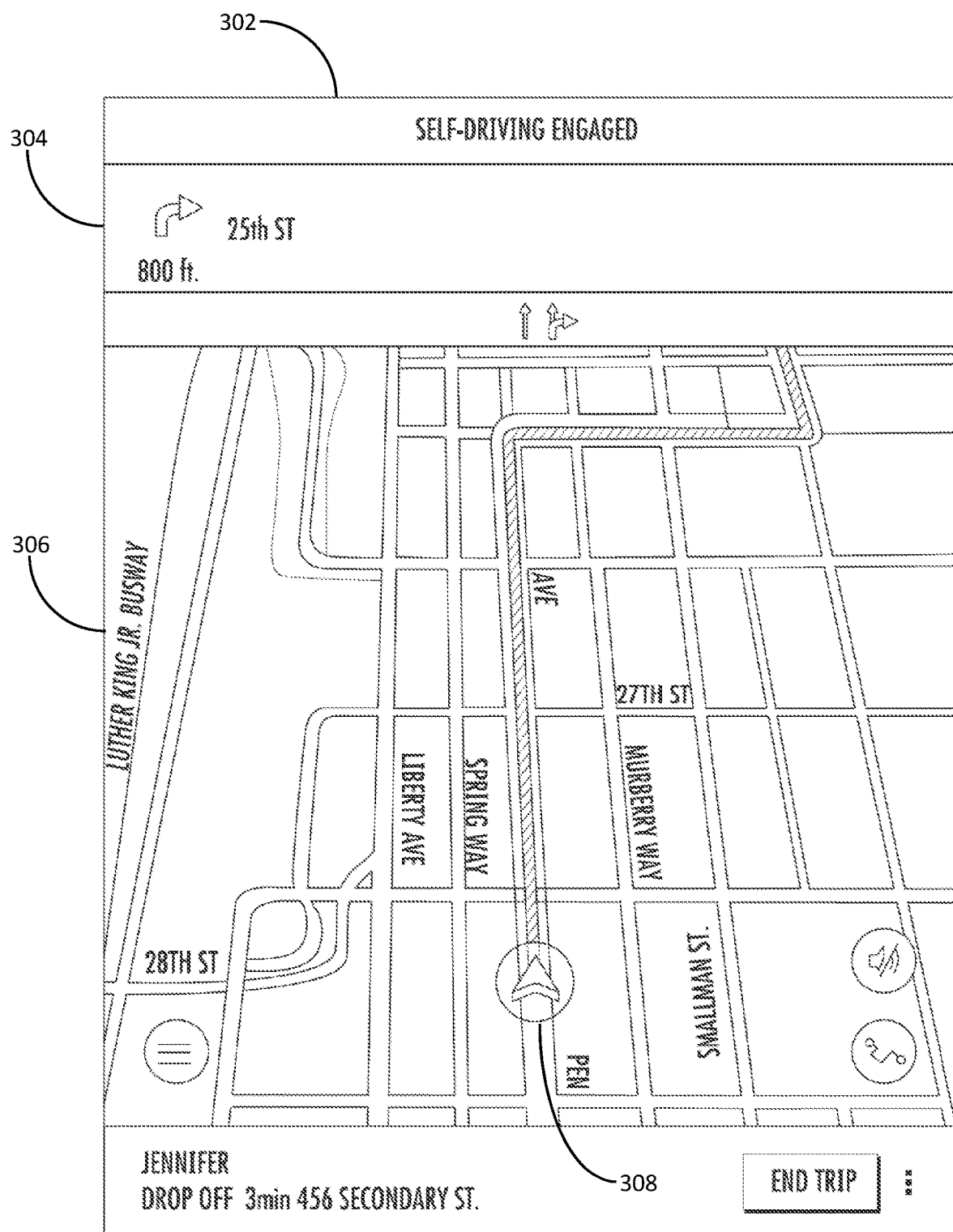
FIGS. 3A-G depict example graphical interfaces for communicating intent of an autonomous vehicle according to example embodiments of the present disclosure.
Figure 3B:
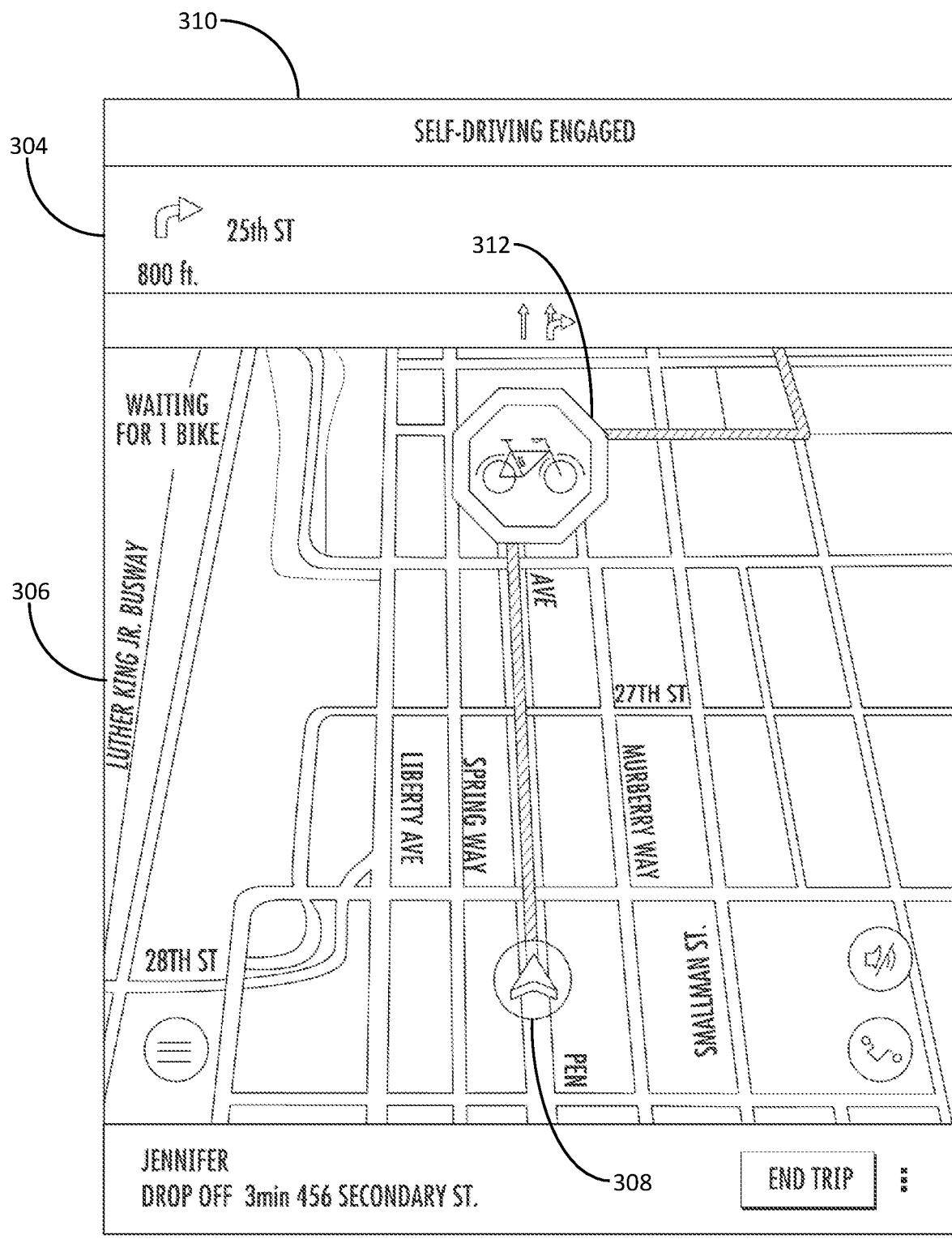
Figure 3C:
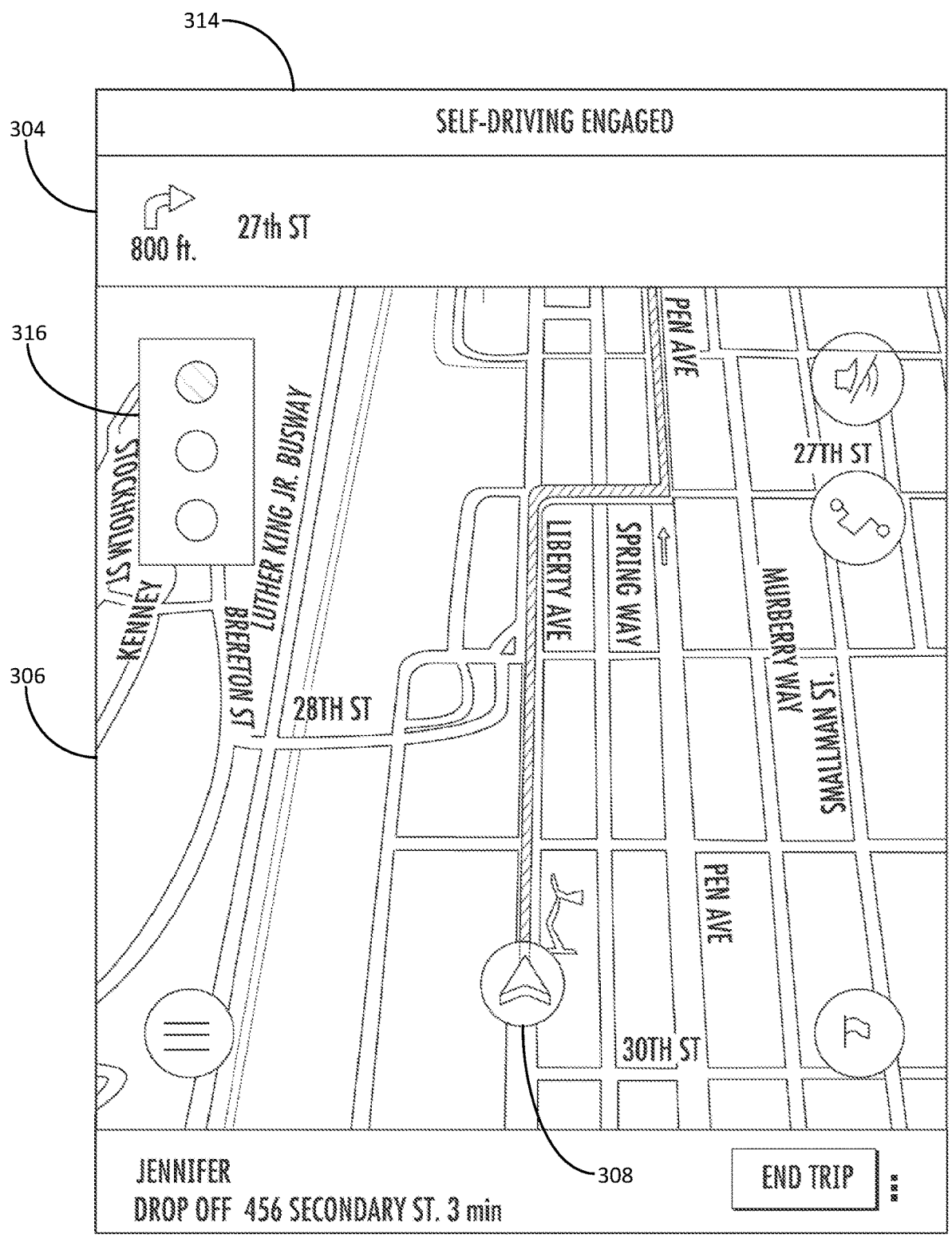
Figure 3D:
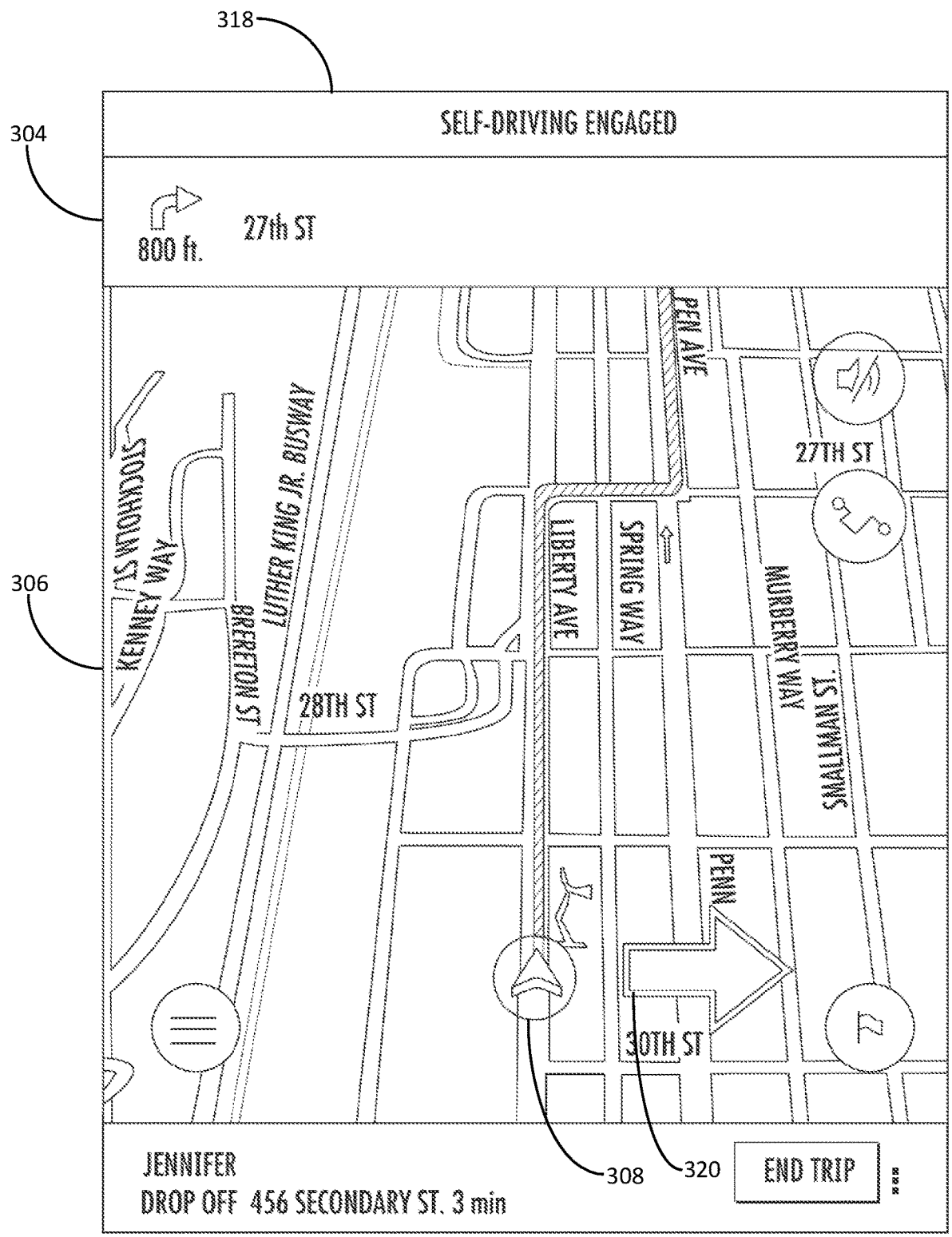
Figure 3E:
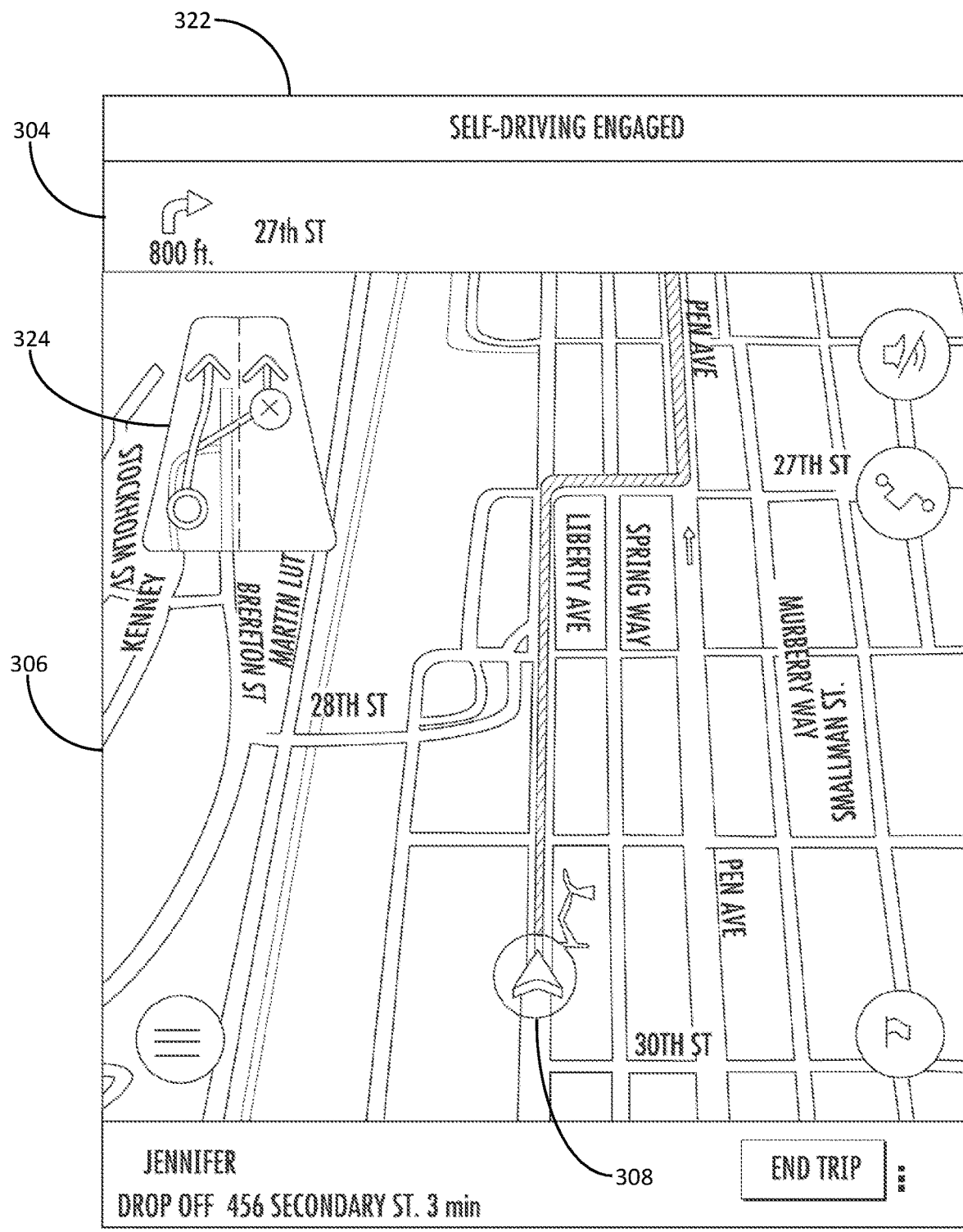
Figure 3F:
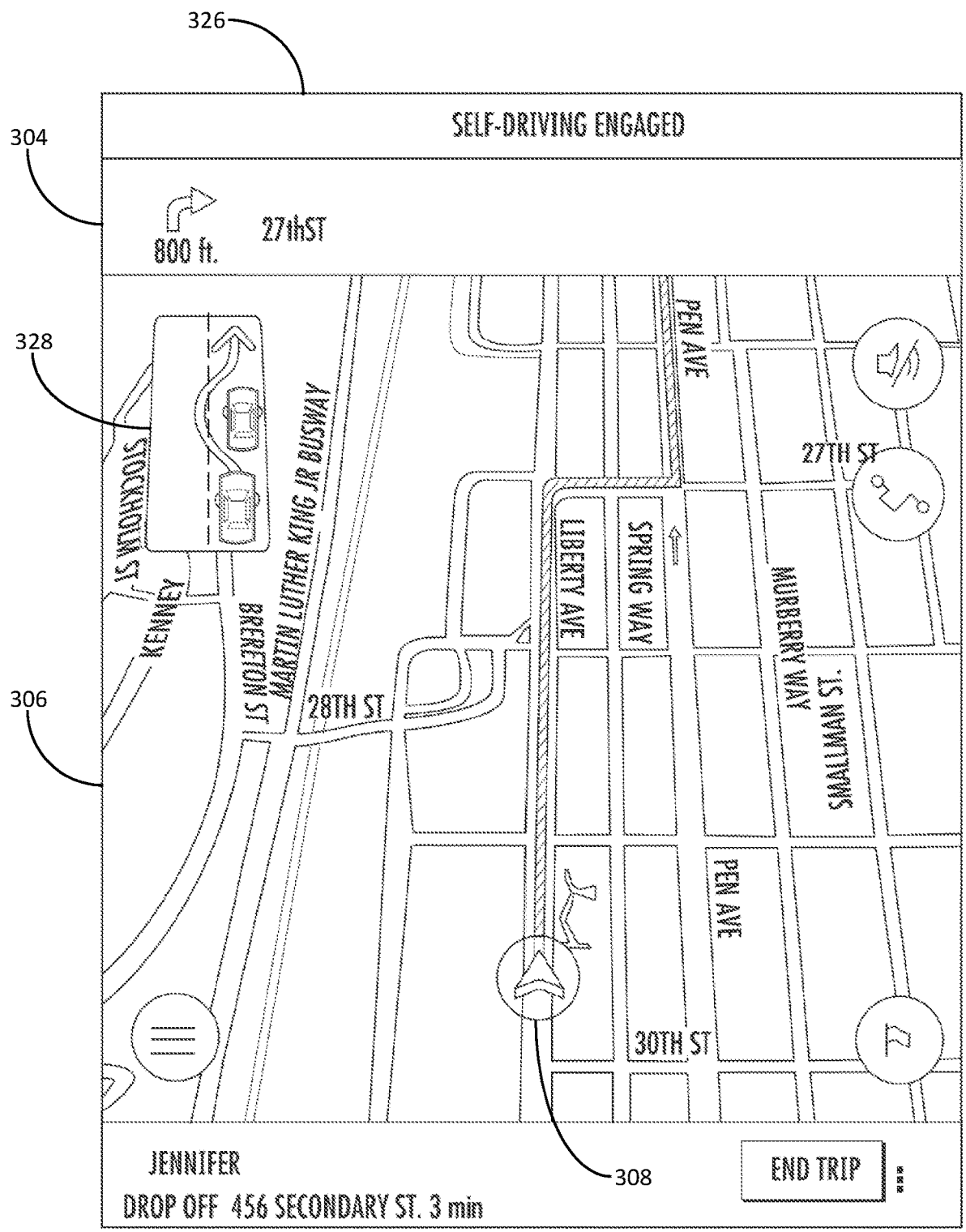
Figure 3G:
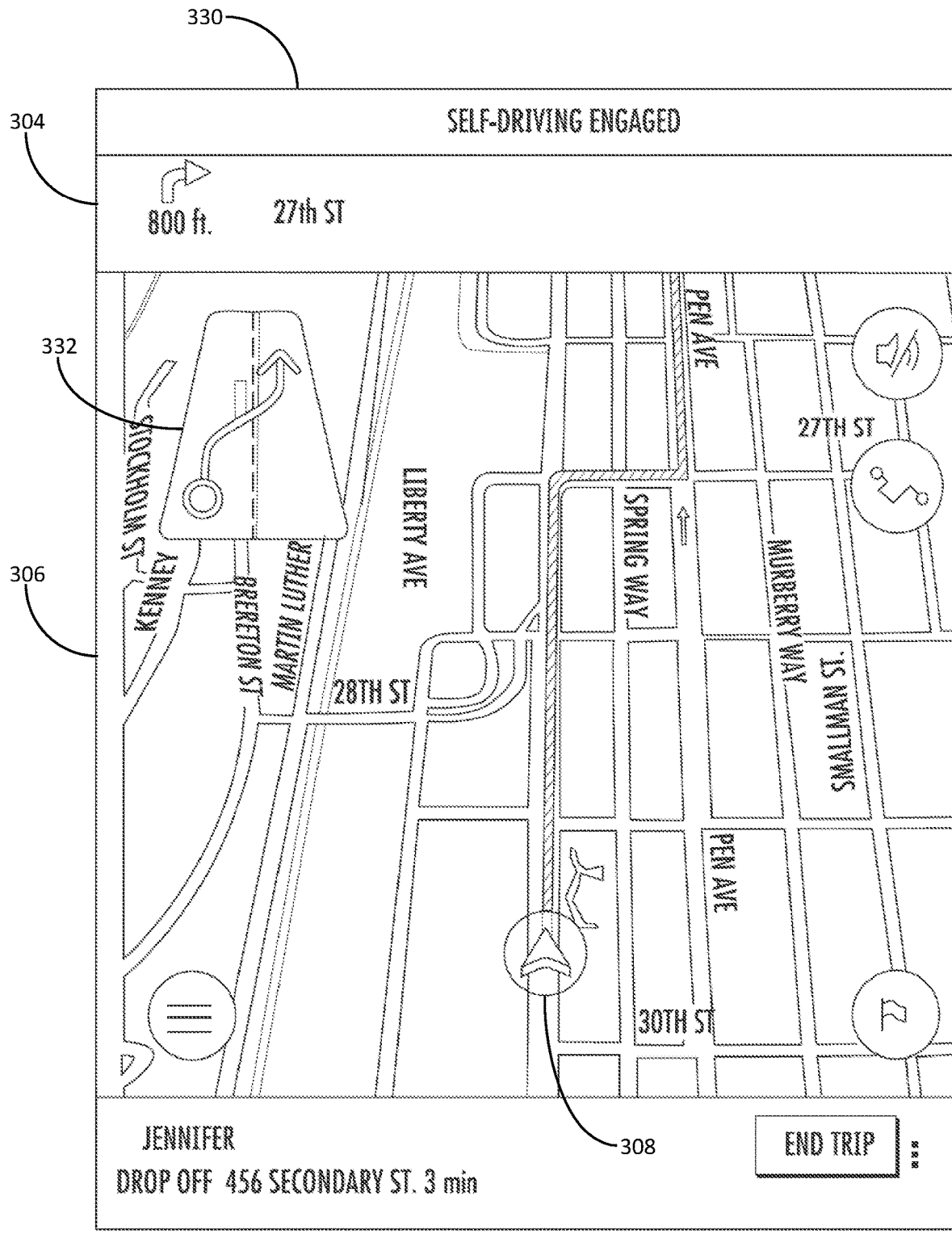

Referring to FIG. 3A, graphical interface 302 can include portion 304 and map 306. Portion 304 can indicate a status of autonomous vehicle 10 on a planned route (e.g., a distance to the next turn on the planned route, or the like). Map 306 can include element 308, which can depict the current location of autonomous vehicle 10 (e.g., within its surrounding environment). As indicated above, human machine interface device 150 can be configured to generate a graphical interface that includes a graphic overlay on the map indicating an intent of autonomous vehicle 10. For example, referring to FIG. 3B, graphical interface 310 can include graphic overlay 312 indicating an intent of autonomous vehicle 10 to remain stopped and/or decelerate in response to a detected cyclist. Similarly, referring to FIG. 3C, graphical interface 314 can include graphic overlay 316 indicating an intent of autonomous vehicle 10 to remain stopped and/or decelerate in response to a red traffic signal; referring to FIG. 3D, graphical interface 318 can include graphic overlay 320 indicating an intent of autonomous vehicle 10 to execute a right-hand turn; referring to FIG. 3E, graphical interface 322 can include graphic overlay 324 indicating an intent of autonomous vehicle 10 to abort a planned lane change (e.g., in response to the presence of another vehicle in the lane); referring to FIG. 3F, graphical interface 326 can include graphic overlay 328 indicating an intent of autonomous vehicle 10 to execute a lane change (e.g., in order to pass an approaching vehicle in its current lane); and referring to FIG. 3G, graphical interface 330 can include graphic overlay 332 indicating an intent of autonomous vehicle 10 to execute a lane change.

Figure 4:
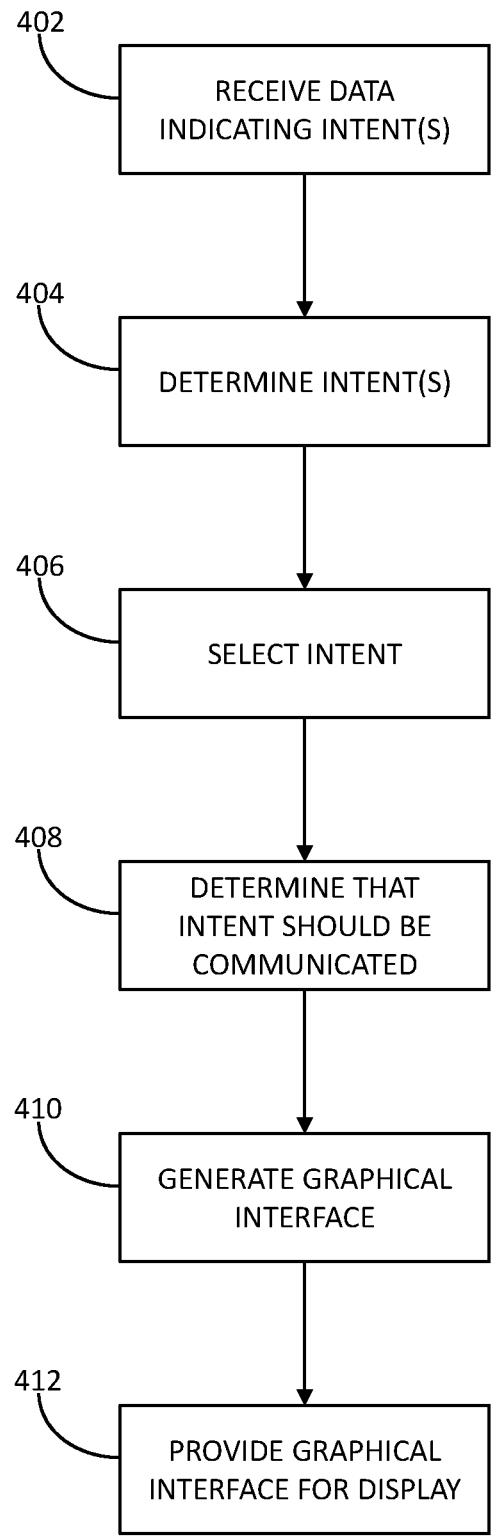
FIG. 4 depicts a flow chart diagram of an example method to communicate intent of an autonomous vehicle according to example embodiments of the present disclosure.

FIG. 4 depicts a flow chart diagram of an example method to communicate intent of an autonomous vehicle according to example embodiments of the present disclosure. Referring to FIG. 4, at (402), data indicating one or more intents of an autonomous vehicle can be received. For example, human machine interface device 150 can receive data indicating one or more intents of autonomous vehicle 10 from autonomy computing system 102. At (404), one or more intents of the autonomous vehicle can be determined. For example, human machine interface device 150 can determine, based on the data received from autonomy computing system 102, one or more intents of autonomous vehicle 10. At (406), an intent of the autonomous vehicle can be selected. For example, human machine interface device 150 can select, from amongst the determined intent(s) (e.g., based on a predetermined hierarchy), an intent to communicate to a passenger of autonomous vehicle 10. At (408), a determination that the intent should be communicated to a passenger of the autonomous vehicle can be made. For example, human machine interface device 150 can determine to communicate the selected intent of autonomous vehicle 10 to a passenger of autonomous vehicle 10 (e.g., based on a determination that a frequency in the change of the intent meets a predetermined threshold, a determination that a degree of confidence of an event associated with the intent meets a predetermined threshold, or the like). At (410), a graphical interface indicating the intent of the autonomous vehicle can be generated. For example, human machine interface device 150 can generate a graphical interface similar to graphical interfaces 310, 314, 318, 322, 326, and/or 330. At (412), the graphical interface indicating the intent of the autonomous vehicle can be provided for display for viewing by the passenger of the autonomous vehicle. For example, human machine interface device 150 can provide a graphical interface similar to graphical interfaces 310, 314, 318, 322, 326, and/or 330 (e.g., via display 158) for viewing by a passenger of autonomous vehicle 10.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing device, comprising:
   one or more processors; and
   one or more memories storing instructions that when executed by the one or more processors cause the one or more processors to perform operations, the operations comprising:
   accessing data describing a plurality of intents of an autonomous vehicle;
   identifying a first intent of the autonomous vehicle from amongst the plurality of intents of the autonomous vehicle, the identified intent of the autonomous vehicle describing an intended action of the autonomous vehicle;
   determining that the first intent of the plurality of intents is associated with a deceleration associated with an approaching intersection transgressing a predetermined threshold;
   causing the first intent to be depicted in a graphical interface in response to determining that the deceleration associated with the approaching intersection transgresses the predetermined threshold, the graphical interface depicting an event associated with the first intent, the event describing a cause of the intended action, the graphical interface comprising a graphic indicating the first intent of the autonomous vehicle;
   determining that a second intent of the plurality of intents is associated with the autonomous vehicle changing speed in response to an object; and
   in response to determining that the second intent is associated with the autonomous vehicle changing speed in response to the object, causing the graphical interface to indicate the second intent comprising a speed of the object and a distance between the autonomous vehicle and the object.

2. The computing device of claim 1, wherein a third intent comprises at least one of changing lanes, decelerating for a traffic signal, decelerating for an approaching vehicle, decelerating for a pedestrian, or decelerating for a cyclist.

3. The computing device of claim 1, wherein the first intent of the autonomous vehicle is selected from amongst the plurality of intents based at least in part on a predetermined hierarchy.

4. The computing device of claim 1, wherein the first intent of the autonomous vehicle is selected based at least in part on the first intent of the autonomous vehicle remaining constant for a threshold period of time.

5. The computing device of claim 1, wherein the graphical interface is indicative of one or more objects to which the autonomous vehicle is yielding.

6. The computing device of claim 1, wherein the graphical interface is indicative of a traffic signal and a color of the traffic signal.

7. The computing device of claim 1, wherein generating the graphical interface comprises generating an interface comprising a map depicting a current location of the autonomous vehicle and a graphic overlay on the map indicating the intent of the autonomous vehicle.

8. The computing device of claim 1, wherein generating the graphical interface comprises generating an interface comprising one or more elements depicting the event associated with the first intent of the autonomous vehicle.

9. The computing device of claim 8, wherein the one or more elements comprise at least one of a time until the intended action is completed, a margin between the autonomous vehicle and an approaching vehicle, a velocity and/or acceleration status of an approaching vehicle, or at least one of a distance to or velocity of:
   another vehicle, a cyclist, or a pedestrian.

10. The computing device of claim 1, wherein the operations further comprise:
    generating an audible signal for a passenger.

11. The computing device of claim 1, wherein the computing device comprises at least one of a smartphone, a tablet computing device, a wearable computing device, a portable gaming device, or a hand-held display screen associated with a passenger.

12. The computing device of claim 11, wherein the computing device is the tablet computing device, the tablet computing device being positioned within the autonomous vehicle.

13. The computing device of claim 1, wherein the autonomous vehicle comprises a human machine interface device, the human machine interface device also generating the graphical interface depicting the intent of the autonomous vehicle.

14. The computing device of claim 1, wherein the computing device communicates with the autonomous vehicle over a network.

15. A computer-implemented method comprising:
    accessing, by a computing device, data describing a plurality of intents of an autonomous vehicle;
    identifying a first intent of the autonomous vehicle from amongst the plurality of intents of the autonomous vehicle, the identified intent of the autonomous vehicle describing an intended action of the autonomous vehicle;
    determining that the first intent of the plurality of intents is associated with a deceleration associated with an approaching intersection transgressing a predetermined threshold;
    causing the first intent to be depicted in a graphical interface in response to determining that the deceleration associated with the approaching intersection transgresses the predetermined threshold, the graphical interface depicting an event associated with the first intent, the event describing a cause of the intended action, the graphical interface comprising a graphic indicating the first intent of the autonomous vehicle;
    determining that a second intent of the plurality of intents is associated with the autonomous vehicle changing speed in response to an object; and
    in response to determining that the second intent is associated with the autonomous vehicle changing speed in response to the object, causing the graphical interface to indicate the second intent comprising a speed of the object and a distance between the autonomous vehicle and the object.

16. The computer-implemented method of claim 15, further comprising:
    determining that the first intent has been changed within a specified time interval;
    computing a frequency in the change of the first intent of the autonomous vehicle within the specified time interval;

determining that the frequency in change of the first intent fails to transgress a threshold; and in response to determining that the frequency in change of the first intent fails to transgress the threshold, causing the graphical interface to be generated.

17. The computer-implemented method of claim 16, further comprising:

determining that the first intent has remained constant over the specified time interval, the graphical interface being generated in response to determining that the first intent has remained constant over the specified time interval.

18. One or more tangible, non-transitory, computer readable media that collectively store instructions that when executed by one or more processors cause the one or more processors to perform operations, the operations comprising:

accessing data describing a plurality of intents of an autonomous vehicle;

identifying a first intent of the autonomous vehicle from amongst the plurality of intents of the autonomous vehicle, the identified intent of the autonomous vehicle describing an intended action of the autonomous vehicle;

determining that the first intent of the plurality of intents is associated with a deceleration associated with an approaching intersection transgressing a predetermined threshold;

causing the first intent to be depicted in a graphical interface in response to determining that the deceleration associated with the approaching intersection transgresses the predetermined threshold, the graphical interface depicting an event associated with the first intent, the event describing a cause of the intended action, the graphical interface comprising a graphic indicating the first intent of the autonomous vehicle;

determining that a second intent of the plurality of intents is associated with the autonomous vehicle changing speed in response to an object; and in response to determining that the second intent is associated with the autonomous vehicle changing speed in response to the object, causing the graphical interface to indicate the second intent comprising a speed of the object and a distance between the autonomous vehicle and the object.

\* \* \* \* \*